US012282308B2

(12) United States Patent
Mihnev et al.

(10) Patent No.: US 12,282,308 B2
(45) Date of Patent: Apr. 22, 2025

(54) INTELLIGENT PROCESS ANOMALY DETECTION AND TREND PROJECTION SYSTEM

(71) Applicant: AVEVA Software, LLC, Lake Forest, CA (US)

(72) Inventors: Aldimir Lyubchev Mihnev, Lake Forest, CA (US); Prarthana Rohitkumar Shah, Lake Forest, CA (US); Brian Kenneth Erickson, Lake Forest, CA (US); William Charles Winn Bielke, Lake Forest, CA (US)

(73) Assignee: Aveva Software, LLC, Lake Forest, CA (US)

( * ) Notice: Subject to any disclaimer, the term of this patent is extended or adjusted under 35 U.S.C. 154(b) by 966 days.

(21) Appl. No.: 17/021,654

(22) Filed: Sep. 15, 2020

(65) Prior Publication Data

US 2021/0080928 A1    Mar. 18, 2021

Related U.S. Application Data

(60) Provisional application No. 62/901,080, filed on Sep. 16, 2019.

(51) Int. Cl.
*G05B 19/4063* (2006.01)
*G06N 3/08* (2023.01)

(52) U.S. Cl.
CPC ......... *G05B 19/4063* (2013.01); *G06N 3/08* (2013.01); *G05B 2219/31449* (2013.01)

(58) Field of Classification Search
None
See application file for complete search history.

(56) References Cited

U.S. PATENT DOCUMENTS

2008/0154512 A1   6/2008  Leong
2016/0047716 A1*  2/2016  Thomson ............ G01M 13/045
                                              702/182

(Continued)

FOREIGN PATENT DOCUMENTS

EP    1927830 A2   6/2008
EP    2752722 A1   7/2014

(Continued)

OTHER PUBLICATIONS

International Search Report and Written Opinion for corresponding PCT Application No. PCT/US2020/050997 dated Dec. 30, 2020, 10 pages.

(Continued)

*Primary Examiner* — Sean Shechtman
(74) *Attorney, Agent, or Firm* — Dergosits & Noah LLP; Todd A. Noah

(57) ABSTRACT

A novel system includes an intelligent process anomaly detection and trend projection system which is configured to train artificial intelligence and machine learning systems for anomaly prediction in industrial systems according to some embodiments. In some embodiments, such intelligent process anomaly detection and trend projection system is configured to determine an estimated remaining useful life of an industrial asset. For example, in some embodiments, the system is configured to identify a degradation part of the signal and a normal part of the signal; separate the degradation part of the signal from the normal part of the signal; identify one or more patterns of a degradation part of the signal and the normal part of the signal; and determine an anomaly prediction based on the one or more patterns.

15 Claims, 6 Drawing Sheets

(56) References Cited

U.S. PATENT DOCUMENTS

2017/0364795 A1   12/2017   Anderson et al.
2018/0159879 A1    6/2018   Mestha et al.
2019/0219994 A1    7/2019   Yan et al.

FOREIGN PATENT DOCUMENTS

| KR | 1020190088581 A | 7/2019 | | |
|---|---|---|---|---|
| WO | 2017/215740 | * | 12/2017 | ............. G05B 23/02 |
| WO | 20170215740 A1 | 12/2017 | | |

OTHER PUBLICATIONS

Extended European Search Report from corresponding European Patent Application No. 20866531.5 dated Aug. 18, 2023.
Search Report from corresponding Chinese Patent Application No. 202080065077.0 dated Jan. 27, 2025.

* cited by examiner

INTELLIGENT PROCESS ANOMALY DETECTION AND TREND PROJECTION SYSTEM

CROSS-REFERENCE RELATED APPLICATIONS

This application claims the benefit of and priority to U.S. Provisional Application No. 62/901,080, filed Sep. 16, 2019, entitled "Intelligent Process Anomaly Detection and Trend Projection System", the entire contents of which are incorporated herein by reference.

BACKGROUND

Building digital infrastructures to capture the operation of a broad class of industrial assets opens the door to a vast space of possibilities. In many instances, the Internet of Things or local sensor networks generate the data needed to initiate sophisticated analysis on process development. Detecting developments of anomalous events in their very initial phases is one of the prominent steps towards operational excellence. After the early detection of a degradation or an anomaly, a maintenance procedure should be undertaken. Often, for various reasons (to prevent long down times, maintenance teams are busy with another operation, the observed degradation is normal for the specific process and there is some more tolerance to be exploited by design, there exists some more tolerance by design even if the degradation is abnormal), the operator of the equipment needs to know for how long they can keep it operational. It would be very advantageous to capture patterns of degradation and estimate the evolution of degradation in the future, and some embodiments of the invention provide such capabilities.

SUMMARY

Some embodiments of present disclosure provide various exemplary technically improved computer-implemented platforms, systems and methods, including providing an improved intelligent process anomaly detection and trend projection system. In some embodiments, the system is configured to receive a signal. In some embodiments, the system is configured to identify a degradation part of the signal and a normal part of the signal. In some embodiments, the system is configured to separate the degradation part of the signal from the normal part of the signal. In some embodiments, the system is configured to identify one or more patterns of a degradation part of the signal and the normal part of the signal. In some embodiments, the system is configured to determine an anomaly prediction based on the one or more patterns. In some embodiments, the system is configured to determine the signal without a seasonal component.

In some embodiments, a seasonal component is a variation in a trend that occurs within a process at specific regular intervals. In some embodiments a seasonal component may result in quality variation as a piece of equipment runs through the "season" of its lifespan. An example of a change that would cause a seasonal component in a trend may be the dulling of a cutting blade resulting in a steady increase in drive motor amperage over time.

In some embodiments, the system is configured to determine an estimate remaining useful life based on the one or more patterns. In some embodiments, the system is configured to perform a multi-resolution differencing scheme. In some embodiments, the system is configured to generate one or more versions of the signal based on the multi-resolution differencing scheme. In some embodiments, the system is configured to determine a higher order differences of each one or more versions of the signal. In some embodiments, the system is configured to identify one or more patterns based on the higher order differences of each one or more versions of the signal.

In some embodiments, the system includes an intelligent process anomaly detection and trend projection system configured to comprise a non-transitory computer-readable program memory storing instructions, a non-transitory computer-readable data memory, and a processor configured to execute the instructions. In some embodiments, the processor is configured to execute the instructions to receive a signal. In some embodiments, the system is configured to identify a degradation part of the signal and a normal part of the signal. In some embodiments, the system is configured to separate the degradation part of the signal from the normal part of the signal. In some embodiments, the system is configured to identify one or more patterns of a degradation part of the signal and the normal part of the signal. In some embodiments, the system is configured to determine an anomaly prediction based on the one or more patterns. In some embodiments, the system is configured to determine the signal without a seasonal component. In some embodiments, the system is configured to determine an estimate remaining useful life based on the one or more patterns. In some embodiments, the system is configured to perform a multi-resolution differencing scheme. In some embodiments, the system is configured to generate one or more versions of the signal based on the multi-resolution differencing scheme. In some embodiments, the system is configured to determine a higher order differences of each one or more versions of the signal. In some embodiments, the system is configured to identify one or more patterns based on the higher order differences of each one or more versions of the signal.

In other embodiments, the intelligent process anomaly detection and trend projection system comprises a non-transitory computer-readable medium including one or more sequences of instructions that, when executed by one or more processors, cause the implementation of one or more operations and/or configurations. In some embodiments, the intelligent process anomaly detection and trend projection system is configured to receive a signal. In some embodiments, the system is configured to identify a degradation part of the signal and a normal part of the signal. In some embodiments, the system is configured to separate the degradation part of the signal from the normal part of the signal. In some embodiments, the system is configured to identify one or more patterns of a degradation part of the signal and the normal part of the signal. In some embodiments, the system is configured to determine an anomaly prediction based on the one or more patterns. In some embodiments, the system is configured to determine the signal without a seasonal component. In some embodiments, the system is configured to determine an estimate remaining useful life based on the one or more patterns. In some embodiments, the system is configured to perform a multi-resolution differencing scheme. In some embodiments, the system is configured to generate one or more versions of the signal based on the multi-resolution differencing scheme. In some embodiments, the system is configured to determine a higher order differences of each one or more versions of the signal. In some embodiments, the system is configured to identify one or more patterns based on the higher order differences of each one or more versions of the signal. In some embodiments, the system is configured to use the one or more patterns identified for training data in an AI model.

DETAILED DESCRIPTION

Figure 1:
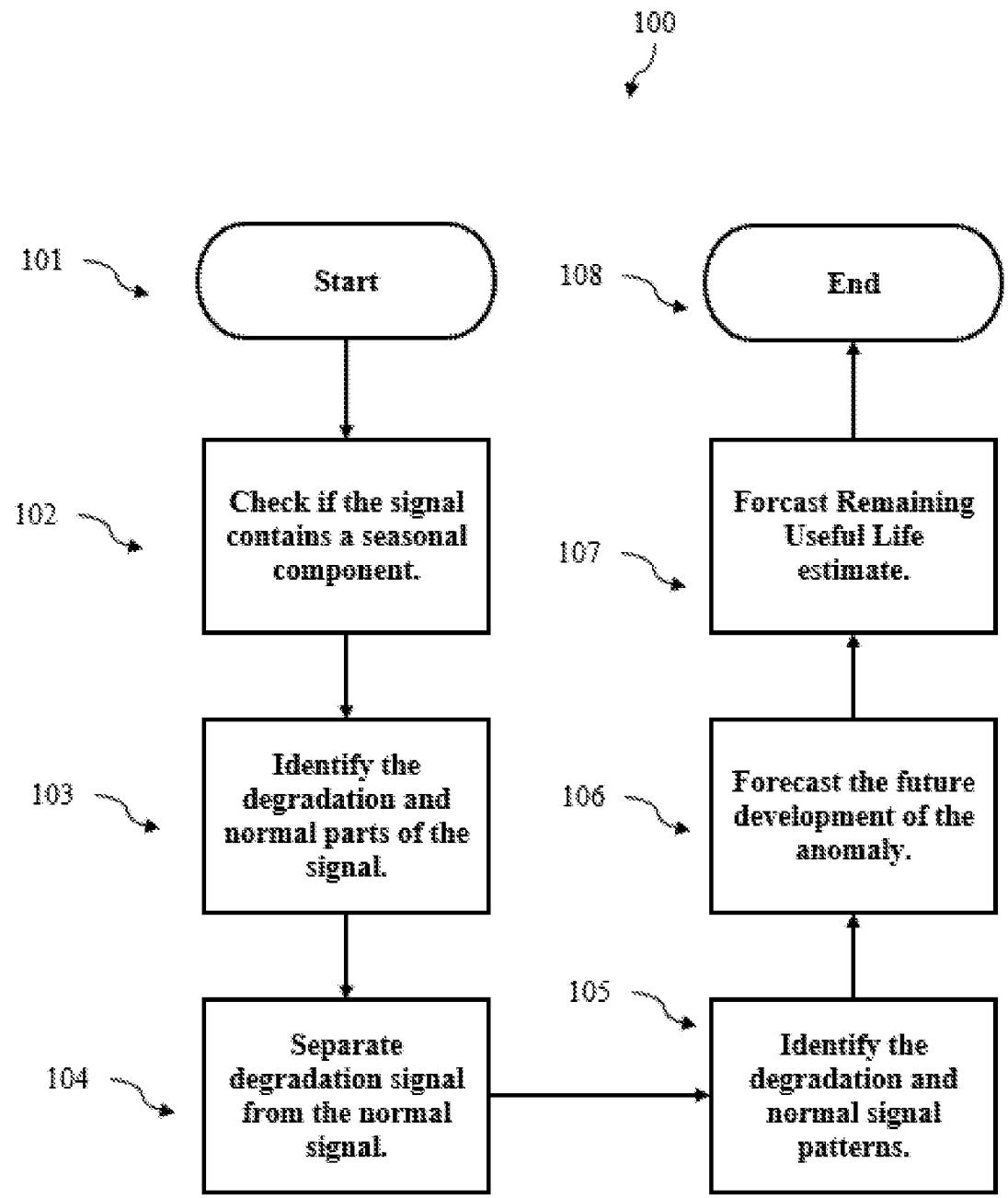
FIG. 1 is a flowchart representing an overview of some embodiments of the system.

Before any embodiments of the invention are explained in detail, it is to be understood that the invention is not limited in its application to the details of construction and the arrangement of components set forth in the following description or illustrated in the following drawings. Some embodiments of the system are configured to be combined with some other embodiments and all embodiments are capable of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use the system. Various modifications to the illustrated embodiments will be readily apparent to those skilled in the art, and the generic principles recited according to some illustrated embodiments are configured to be applied to and/or combined with some other illustrated embodiments and applications without departing from embodiments of the invention. Thus, embodiments of the invention are not intended to be limited to embodiments shown but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Some embodiments of the invention include various methods, apparatuses (including computer systems) that perform such methods, and computer readable media containing instructions that, when executed by computing systems, cause the computing systems to perform such methods. For example, some non-limiting embodiments comprise certain software instructions or program logic stored on one or more non-transitory computer-readable storage devices that tangibly store program logic for execution by one or more processors of the system and/or one or more processors coupled to the system.

In the statistical literature, one can find a clear answer as to why using underrepresented classes of observations (e.g. anomalous events), will face unresolvable challenges when the goal is to estimate future behaviors. Some embodiments of the invention resolve these challenges.

Some embodiments of the system include one or more of the following phases:

I. Check to see if the signal contains a seasonal component according to some embodiments.

In some embodiments, the system is configured to use a Fourier transform to check for a seasonal component. In some embodiments, if the signal does not contain a seasonal component, the system is configured to capture the linear or exponential monotonic behaviors of the anomalies. In some embodiments, if the signal does contain a seasonal component, the system is configured to capture the linear or exponential monotonic behaviors of the anomalies and add a preprocessing step to consider the signal in terms of its Fourier components.

II. Identify the degradation part of the signal and separate it from the normal behavior according to some embodiments.

In some embodiments, the discovery of the anomalous patterns is governed by computations of statistics on parts of the signal itself or on parts of its transformed version. In some embodiments, a multi-resolution differencing scheme creates multiple versions of the signal by using integer factors to down-sample the signal. In some embodiments, the system is configured to schedule a different differencing agent to operate on each signal representation. In some embodiments, the task of these agents is to find the first (or higher order, depending on the pattern) differences of their corresponding signal representations. In some embodiments, then different statistics of choice (e.g., conventional statistical methods) are used on the differenced time series to detect changes in the distribution. In some embodiments, the system is configured to partition the signal representation into samples of uniform size. In some embodiments, the statistic of choice is entropy. In some embodiments, the main indicator for the identity of a pattern is the sequence of decreasing differential entropies over the samples. In some embodiments, if such identity or stability in the form of a trending pattern exists, the differencing agents will expose it and it will be captured through the loss of entropic information. Multiple big differences in the magnitudes of these losses indicate the existence of multiple patterns within the degrading part according to some embodiments.

III. Identify the patterns contained in the normal behavior using the strategies described in Phase II according to some embodiments.

IV. In some embodiments, use the above patterns as the training data for a model (i.e., artificial intelligence, machine learning model) that will forecast the future development of the anomaly.

In some embodiments, the system is configured to estimate the future development given the last pattern of degradation. In some embodiments, the data under the last identity from phase II becomes the training data for the model to be used. In some embodiments, many different modeling schemes are configured to be used to extrapolate from that identity of equipment behavior. In some embodiments, if feedforward ANN (artificial neural network) is used, then in order to make it autoregressive (NARX), the system is configured to use the order of the differencing agent as the number of delays. In some embodiments, a Long Short-Term Memory (LSTM) ANN is used to model the dynamical representation of the system. In some embodiments, the system is configured to use LSTM as a stochastic machine, although different methods are used to infer the stochastic part of the weights. In some embodiments, the system is configured to use variational inference to generate a distribution over the prediction sequences. In some embodiments, the system is configured to use the connection between the order of the differencing agent that identified the last trending pattern and the length of the input sequence for LSTM.

In some embodiments, if more computational resources are available, various statistical techniques are used to compare the sequence of patterns in the degradation with the patterns in the normal operation and decide which samples or transformation of samples to include in the training dataset.

V. The parameters of the overall design are inferred via mathematical optimization according to some embodiments.

In general, abstracting from the specificity of the embodiments, in some embodiments, the system is configured to involve design parameters where no prior knowledge exists (differencing order, sample sizes that constitute the sequences of the identity, learning rates and number of LSTM cells, etc.). Further, in some embodiments, different values of these parameters significantly influence the results. Therefore, in some embodiments, estimators for these parameters are used (e.g. Cross Validation). In some embodiments, the system is configured to use Bayesian Optimization with acquisition function (e.g., Expected Improvement).

VI. Forecasting the development of the anomaly according to some embodiments

In some embodiments, many regression techniques are used in the system. In some embodiments, the system is configured to use estimates of the prediction error and the output sequence from an LSTM model. In some embodiments, from the resulting distribution, the system is configured to compute the path that is associated with the desired risk specification. In some embodiments, the system is then configured to derive the First Hitting Time from both the intersection of this path and a threshold of critical load for the assets of interest. Hence, in some embodiments, apart from using this estimated path of the underlying anomaly as an estimate of its future development, the system is configured to use it to obtain a Remaining Useful Life estimate for the asset.

In some embodiments, the system is configured to use the same setup as above but with the exception that the system is configured to infer the stochastic behavior of the LSTM parameters using variational inference (which produces more precise results). In some embodiments, such Stochastic LSTM is trained to generate many, sometimes very different from what was observed, possibilities in the future trajectory of the asset. In some embodiments, from this rich collection of simulations, the system is configured to derive the most probable path, its standard error and the path corresponding to the risk that was specified by the operator of the asset.

FIG. 1 is a flowchart 100 representing an overview of some embodiments of the system. For example, the system of FIG. 1 is configured to provide an estimate remaining useful life according to some embodiments.

In some embodiments, in FIG. 1, the system 110 includes: checking 102 if the signal contains a seasonal component; identifying 103 the degradation and normal parts of the signal; separating 104 degradation signal from the normal signal; identifying 105 the degradation and normal signal patterns; forecasting 106 the future development of the anomaly; and forecasting 108 remaining useful life estimate.

Figure 2:
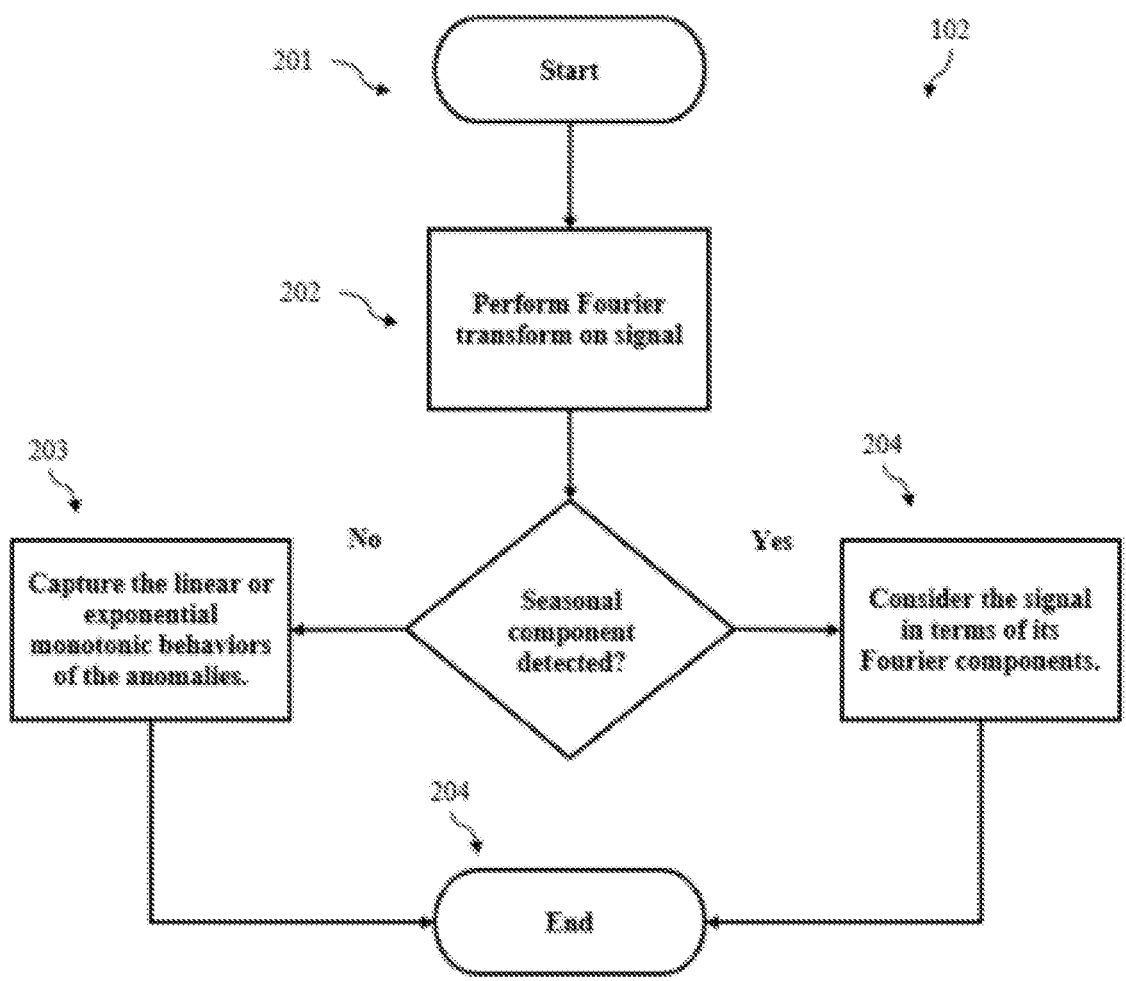
FIG. 2 is a flowchart elaborating on details of the seasonal component check step of FIG. 1 according to some embodiments.

FIG. 2 is a flowchart 102 elaborating on details of the seasonal component check step of FIG. 1 according to some embodiments. For example, the system of FIG. 2 is configured to determine if the signal includes a seasonal component according to some embodiments.

In some embodiments, in FIG. 2, the system 201 includes: performing 202 Fourier transform on the signal; determining whether a seasonal component is detected in the signal; in response to the seasonal component is not detected in the signal 203, capturing the linear or exponential monotonic behaviors of the anomalies; in response to the seasonal component is detected in the signal 204, considering the signal in terms of its Fourier components.

Figure 3:
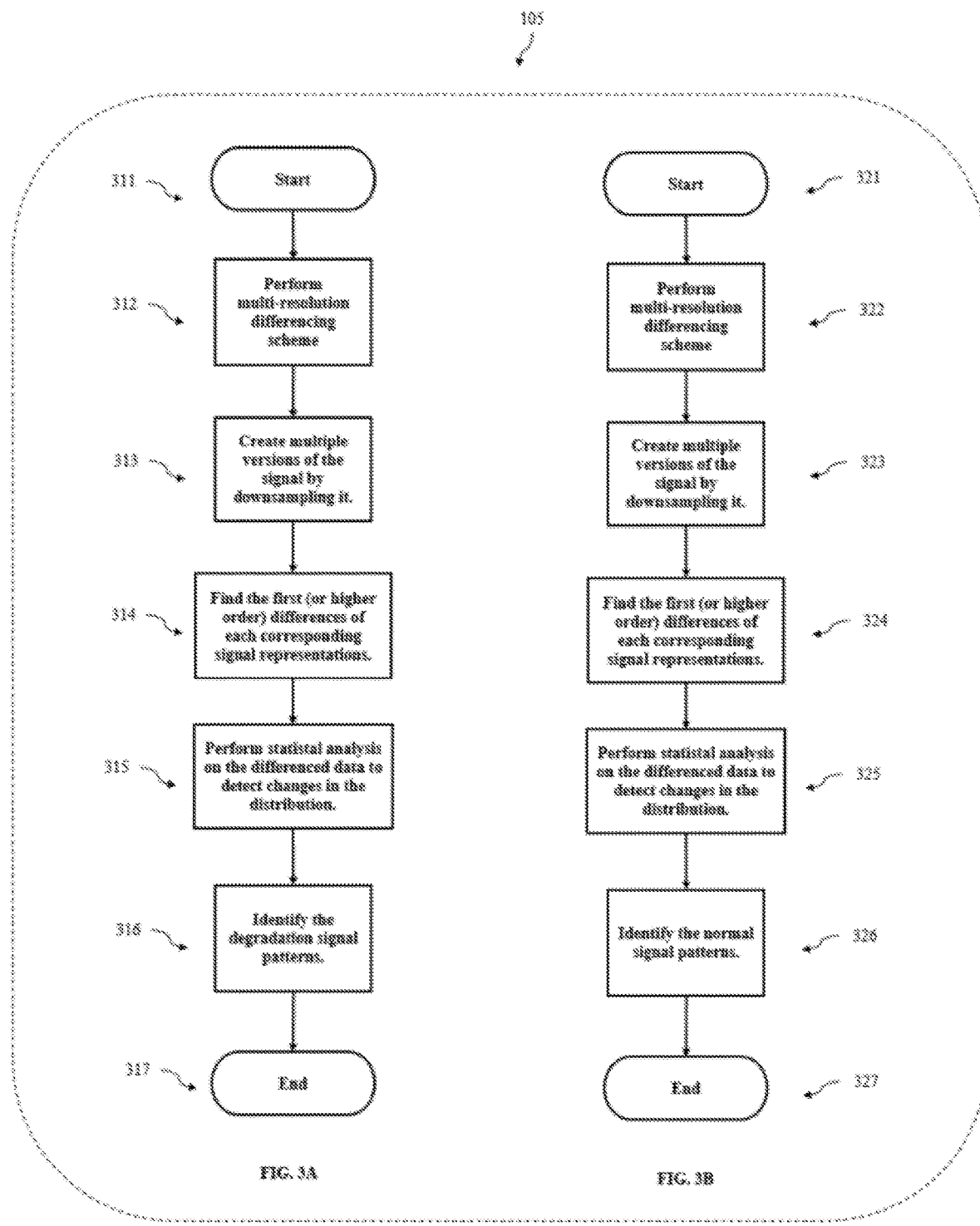
FIG. 3 is a flowchart elaborating on details of the normal and degradation signal identification step of FIG. 1 according to some embodiments.

FIG. 3 is a flowchart 105 elaborating on details of the normal and degradation signal identification step of FIG. 1 according to some embodiments. For example, the system 311 of FIG. 3 is configured to identify the degradation signal patterns according to some embodiments. For another example, the system 321 of FIG. 3 is configured to identify the normal signal patterns according to some embodiments.

In some embodiments, in FIG. 3, the system 311-317 includes: performing 312 multi-resolution differencing scheme; creating 313 multiple versions of the signal by down-sampling it; finding 314 the first (or higher order) differences of each corresponding signal representations; performing 315 statistical analysis on the differenced data to detect changes in the distribution; and identifying 316 the degradation signal patterns.

In some embodiments, in FIG. 3, the system 321-327 includes: performing 322 multi-resolution differencing scheme; creating 323 multiple versions of the signal by down-sampling it; finding 324 the first (or higher order) differences of each corresponding signal representations; performing 325 statistical analysis on the differenced data to detect changes in the distribution; and identifying 326 the normal signal patterns.

Figure 4:
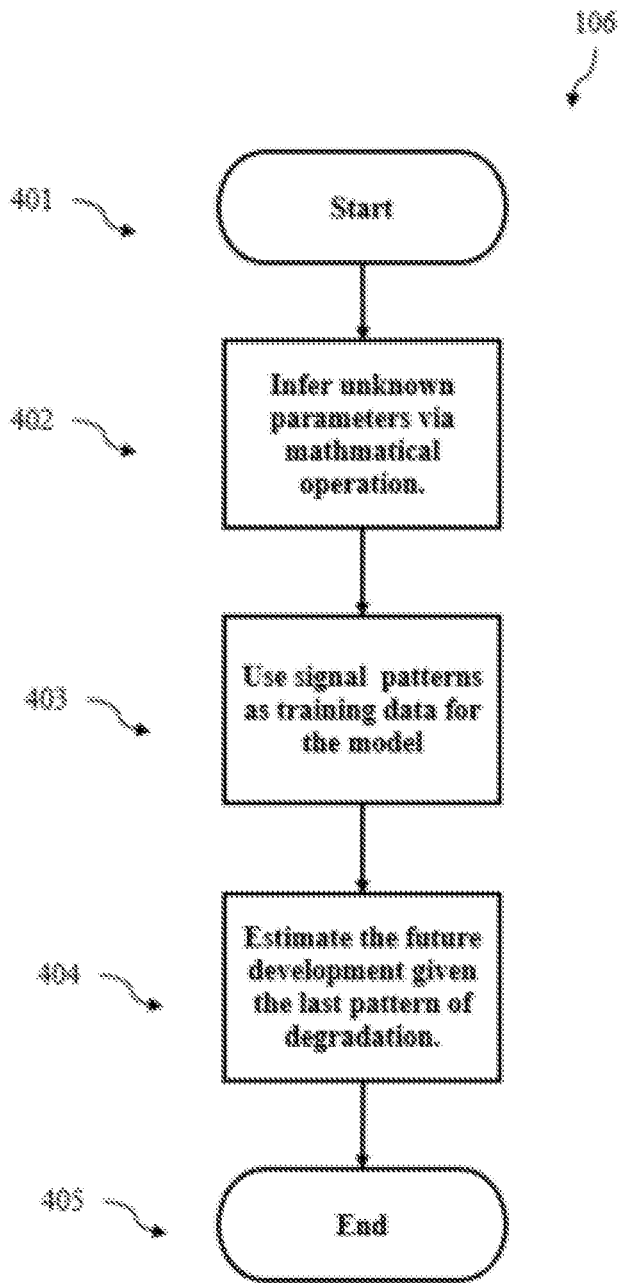
FIG. 4 is a flowchart elaborating on details of the future anomaly forecasting step of FIG. 1 according to some embodiments.

FIG. 4 is a flowchart 106 elaborating on details of the future anomaly forecasting step of FIG. 1 according to some embodiments. For example, the method 401 of FIG. 4 is configured to estimate the future development according to some embodiments.

In some embodiments, in FIG. 4, the system 401-405 includes: inferring 402 unknown parameters via mathematical operation; using 403 signal patterns as training data for the model; estimating 404 the future development given the last pattern of degradation.

Figure 5:
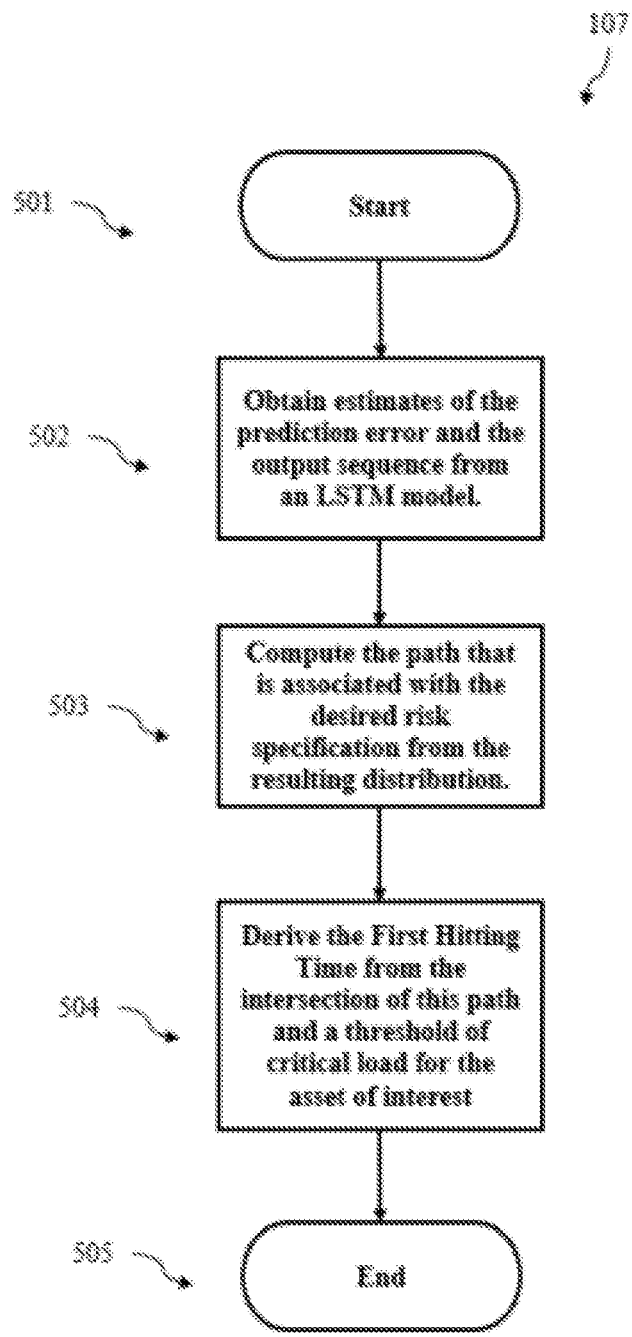
FIG. 5 is a flowchart elaborating on details of the remaining useful life forecasting step of FIG. 1 according to some embodiments.

FIG. 5 is a flowchart 107 elaborating on details of the remaining useful life forecasting step of FIG. 1 according to some embodiments. For example, the system 501 of FIG. 5 is configured to derive the first hitting time according to some embodiments.

In some embodiments, in FIG. 5, the system 501-505 includes: obtaining 502 estimates of the prediction error and the output sequence from a Long Short-Term Memory (LSTM) model; computing 503 the path that is associated with the desired risk specification from the resulting distribution; deriving 504 the First Hitting Time from the intersections of this path and a threshold of critical load for the asset of interest.

Figure 6:
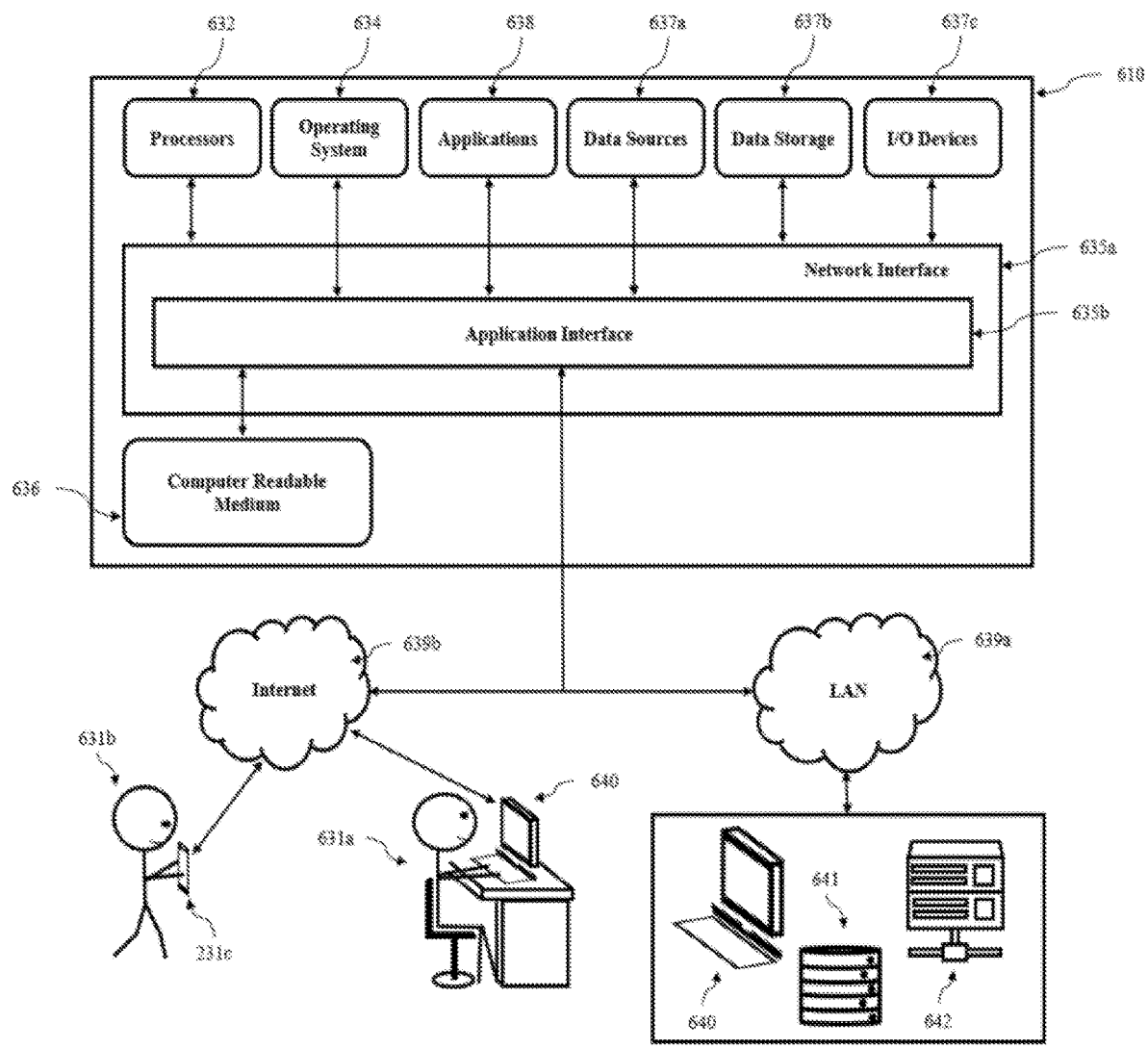
FIG. 6 illustrates a computer system enabling or operating the intelligent process anomaly detection and trend projection according to some embodiments.

FIG. 6 illustrates a computer system enabling or operating the intelligent process anomaly detection and trend projection system according to some embodiments. In some embodiments, the intelligent process anomaly detection and trend projection system is configured to be operatively coupled to the computer system 610 shown in FIG. 6 or the computer system 610 is configured to comprise the intelligent process anomaly detection and trend projection system. In some embodiments, the computer system 610 is configured to include and/or operate and/or process computer-executable code of one or more of the above-mentioned program logic, software modules, and/or systems. Further, in some embodiments, the computer system 610 is configured to operate and/or display information within one or more graphical user interfaces coupled to the intelligent process anomaly detection and trend projection system. In some embodiments, the computer system 610 comprises a cloud server and/or can be coupled to one or more cloud-based server systems.

In some embodiments, the system 610 is configured to comprise at least one computer including at least one processor 632. In some embodiments, the at least one processor 632 includes a processor residing in, or coupled to, one or more server platforms. In some embodiments, the system 610 includes a network interface 635*a* and an application interface 635*b* coupled to the least one processor 632 capable of processing at least one operating system 634. Further, in some embodiments, the interfaces 635*a*, 635*b* coupled to at least one processor 632 are configured to process one or more of the software modules 638 (e.g., such as enterprise applications). In some embodiments, the software modules 638 are configured to include server-based software, and operate to host at least one user account and/or at least one client account, and operate to transfer data between one or more of these accounts using the at least one processor 632.

With the above embodiments in mind, it should be understood that the invention can employ various computer-implemented operations involving data stored in computer systems. Moreover, in some embodiments, the above-described databases and models described throughout can store analytical models and other data on computer-readable storage media within the system 610 and on computer-readable storage media coupled to the system 610. In addition, in some embodiments, the above-described applications of the system are configured to be stored on computer-readable storage media within the system 610 and/or on computer-readable storage media coupled to the system 610. In some embodiments, these operations are those requiring physical manipulation of physical quantities. Usually, though not necessarily, in some embodiments, these quantities take the form of electrical, electromagnetic, or magnetic signals, optical or magneto-optical form capable of being stored, transferred, combined, compared and otherwise manipulated. In some embodiments, the system 610 comprises at least one computer readable medium 636 coupled to at least one data source 637*a*, and/or at least one data storage device 637*b*, and/or at least one input/output device 637*c*.

In some embodiments, the invention can be embodied as computer readable code on a computer readable medium 636. In some embodiments, the computer readable medium 636 is any data storage device that can store data, which can thereafter be read by a computer system (such as the system 610). In some embodiments, the computer readable medium 636 is any physical or material medium that can be used to tangibly store the desired information or data or instructions and which can be accessed by a computer or processor 632.

In some embodiments, the computer readable medium 636 includes hard drives, network attached storage (NAS), read-only memory, random-access memory, FLASH based memory, CD-ROMs, CD-Rs, CD-RWs, DVDs, magnetic tapes, other optical and non-optical data storage devices. In some embodiments, various other forms of computer-readable media 636 transmit or carry instructions to a computer 640 and/or at least one user 631, including a router, private or public network, or other transmission device or channel, both wired and wireless. In some embodiments, the software modules 638 is configured to send and receive data from a database (e.g., from a computer readable medium 636 including data sources 637*a* and data storage 637*b* that comprises a database), and data is received by the software modules 638 from at least one other source. In some embodiments, at least one of the software modules 638 is configured within the system to output data to at least one user 631 via at least one graphical user interface rendered on at least one digital display.

In some embodiments, the computer readable medium 636 can be distributed over a conventional computer network via the network interface 635*a* where the system embodied by the computer readable code can be stored and executed in a distributed fashion. For example, in some embodiments, one or more components of the system 610 is configured to send and/or receive data through a local area network ("LAN") 639*a* and/or an internet coupled network 639*b* (e.g., such as a wireless internet). In some further embodiments, the networks 639*a*, 639*b* are configured to include wide area networks ("WAN"), direct connections (e.g., through a universal serial bus port), and/or other forms of computer-readable media 636, and/or any combination thereof.

In some embodiments, components of the networks 639*a*, 639*b* include any number of user devices such as personal computers including for example desktop computers, and/or laptop computers, and/or any fixed, generally non-mobile internet appliances coupled through the LAN 639*a*. For example, some embodiments include personal computers 640, databases 641, servers 642, or any other computing devices coupled through the LAN 639*a*, where each can be configured for any type of user including an administrator. Some embodiments include personal computers coupled through network 639*b*. In some further embodiments, one or more components of the system 610 are coupled to send or receive data through an internet network (e.g., such as network 639*b*).

For example, some embodiments include at least one user 631 coupled wirelessly and accessing one or more software modules of the system including at least one enterprise application 638 via an input and output ("I/O") device 637*c*. In some other embodiments, the system 610 can enable at least one user 631 to be coupled to access enterprise applications 638 via an I/O device 637*c* through LAN 639*a*. In some embodiments, the user 631 can comprise a user 631*a* coupled to the system 610 using a desktop computer, laptop computers, and/or any fixed, generally non-mobile internet appliances coupled through the internet 639*b*. In some further embodiments, the user 631 comprises a mobile user 631*b* coupled to the system 610. In some embodiments, the user 631*b* can use any mobile computer 631*c* to wireless coupled to the system 610, including, but not limited to, personal digital assistants, and/or cellular phones, mobile phones, or smart phones, and/or pagers, and/or digital tablets, and/or fixed or mobile internet appliances.

The subject matter described herein are directed to technological improvements to the field of artificial intelligence by providing an improved method of teaching ANN and LSTM, for example, how to identify anomalies in trends with multiple signals and create better prediction models based on those trends. The disclosure describes the specifics of how a machine including one or more computers comprising one or more processors and one or more non-transitory computer implement the system and its improvements over the prior art. The instructions executed by the machine cannot be performed in the human mind or derived by a human using a pin and paper but require the machine to convert process input data to useful output data. Moreover, the claims presented herein do not attempt to tie-up a judicial exception with known conventional steps implemented by a general-purpose computer; nor do they attempt to tie-up a judicial exception by simply linking it to a technological field. Indeed, the systems and methods described herein were unknown and/or not present in the public domain at the time of filing, and they provide a technologic improvements advantages not known in the prior art. Furthermore, the system includes unconventional steps that confine the claim to a useful application.

It is understood that the system is not limited in its application to the details of construction and the arrangement of components set forth in the previous description or illustrated in the drawings. The system and methods disclosed herein fall within the scope of numerous embodiments. The previous discussion is presented to enable a person skilled in the art to make and use embodiments of the system. Modifications to the illustrated embodiments and the generic principles herein can be applied to all embodiments and applications without departing from embodiments of the system. Also, it is understood that features from some embodiments presented herein are combinable with other features according to some embodiments. Thus, some embodiments of the system are not intended to be limited to what is illustrated but are to be accorded the widest scope consistent with all principles and features disclosed herein.

Some embodiments of the system are presented with specific values and/or setpoints. These values and setpoints are not intended to be limiting and are merely examples of a higher configuration versus a lower configuration and are intended as an aid for those of ordinary skill to make and use the system.

Furthermore, acting as Applicant's own lexicographer, Applicant imparts the additional meaning to the following terms:

"Substantially" and "approximately" when used in conjunction with a value encompass a difference of 5% or less of the same unit and/or scale of that being measured. In some embodiments, "substantially" and "approximately" are defined as presented in the specification in accordance with some embodiments.

"Simultaneously" as used herein includes lag and/or latency times associated with a conventional and/or proprietary computer, such as processors and/or networks described herein attempting to process multiple types of data at the same time. "Simultaneously" also includes the time it takes for digital signals to transfer from one physical location to another, be it over a wireless and/or wired network, and/or within processor circuitry.

The use of and/or, in terms of "A and/or B," means one option could be "A and B" and another option could be "A or B." Such an interpretation is consistent with the USPTO Patent Trial and Appeals Board ruling in *ex parte Gross*, where the Board established that "and/or" means element A alone, element B alone, or elements A and B together.

As used herein, some embodiments recited with term "can" or "may" or derivations there of (e.g., the system display can show X) is for descriptive purposes only and is understood to be synonymous with "configured to" (e.g., the system display is configured to show X) for defining the metes and bounds of the system The previous detailed description is to be read with reference to the figures, in which like elements in different figures have like reference numerals. The figures, which are not necessarily to scale, depict some embodiments and are not intended to limit the scope of embodiments of the system.

Any of the operations described herein that form part of the invention are useful machine operations. The invention also relates to a device or an apparatus for performing these operations. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general-purpose computer selectively activated or configured by one or more computer programs stored in the computer memory, cache, or obtained over a network. When data is obtained over a network the data can be processed by other computers on the network, e.g. a cloud of computing resources.

The embodiments of the invention can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, some embodiments include methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data.

Although method operations are presented in a specific order according to some embodiments, the execution of those steps do not necessarily occur in the order listed unless an explicitly specified. Also, other housekeeping operations can be performed in between operations, operations can be adjusted so that they occur at slightly different times, and/or operations can be distributed in a system which allows the occurrence of the processing operations at various intervals associated with the processing, as long as the processing of the overlay operations are performed in the desired way and result in the desired system output.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A system for providing an anomaly detection and trend projection of industrial asset deterioration comprising:
   one or more computers comprising one or more processors and one or more non-transitory computer readable media, the one or more non-transitory computer readable media including instructions stored thereon that when executed by the one or more processors implement the following steps:
   receiving a signal from a sensor coupled to an asset within an industrial process, the asset comprising of a plurality of components;
   determining if at least one of the plurality of components is a seasonal component that predictably degrades during regular intervals, by analyzing the signal for a variation in a trend that occurs within the signal at the regular intervals during a lifespan of the asset;
   identifying a degradation part of the signal and a normal part of the signal in response to a determination that the seasonal component was not detected within the plurality of components of the asset;
   separating the degradation part of the signal from the normal part of the signal;
   identifying one or more patterns of a degradation part of the signal and the normal part of the signal;
   determining a prediction of a future development of an anomaly based on the one or more patterns;
   determining an estimate of remaining useful life for the asset based on the prediction of the future development of the anomaly and the one or more patterns; and
   performing a maintenance procedure on at least one of the components of the asset based on the estimate of remaining useful life.

2. The system of claim 1, the identifying one or more patterns of a degradation part of the signal and the normal part of the signal further comprising performing a multi-resolution differencing scheme.

3. The system of claim 2, further comprising generating one or more versions of the signal based on the multi-resolution differencing scheme.

4. The system of claim 3, further comprising determining one or more higher order differences of each one or more versions of the signal.

5. The system of claim 4, further comprising identifying one or more patterns based on the one or more higher order differences of each one or more versions of the signal.

6. A system for providing an anomaly detection and trend projection comprising:
   one or more sensors coupled to one or more physical assets, the one or more physical assets configured to produce an output;
   one or more computers comprising one or more processors and one or more non-transitory computer readable media, the one or more non-transitory computer readable media including instructions stored thereon that when executed by the one or more processors configure the one or more computers to:
   receive one or more signals from the one or more sensors coupled to an asset comprising a plurality of components;
   determine if at least one of the plurality of components is a seasonal component by analyzing the signal for a variation in a trend that occurs within the signal at regular intervals during a lifespan of the asset;
   identify a degradation part of the signal and a normal part of the signal in response to a determination that the seasonal component was not detected within the plurality of components of the asset;
   separate the degradation part of the one or more signals from the normal part of the one or more signals;
   identify one or more patterns of a degradation part of the one or more signals and the normal part of the one or more signals;
   input the one or more patterns into an artificial neural network to determine a prediction of a future development of an anomaly;
   determine an estimate remaining useful life based on the prediction of the future development of an anomaly; and
   perform a maintenance procedure on at least one of the components of the asset based on the estimate of remaining useful life.

7. The system of claim 6, wherein to identify one or more patterns of a degradation part of the signal and the normal part of the signal further includes performing a multi-resolution differencing scheme.

8. The system of claim 7, the instructions further configured to generate one or more versions of the signal based on the multi-resolution differencing scheme.

9. The system of claim 8, the instruction further configured to determine a higher order difference of each one or more versions of the signal.

10. The system of claim 9, the instructions further configured to identify one or more patterns based on the higher order differences of each one or more versions of the signal.

11. An anomaly detection and trend projection system comprising:
   one or more computers comprising one or more processors and one or more non-transitory computer readable media, the one or more non-transitory computer readable media including instructions stored thereon that when executed by the one or more processors configure the one or more computers to:
   receive a signal from a sensor coupled to a physical asset configured to produce mechanical work within an industrial process, the asset comprising of a plurality of components;
   determine if at least one of the plurality of components is a seasonal component by analyzing the signal for a variation in a trend that occurs within the signal at regular intervals during a lifespan of the asset;
   identify a degradation part of the signal and a normal part of the signal in response to a determination that the seasonal component was not detected within the plurality of components of the asset;
   separate the degradation part of the signal from the normal part of the signal;
   identify one or more patterns of a degradation part of the signal and the normal part of the signal;

train an artificial neural network using the one or more patterns, the artificial neural network is configured to output an anomaly prediction based on the one or more patterns on a display;

determine an estimate of remaining useful life for the asset based on the anomaly prediction; and perform a maintenance procedure on at least one of the components of the asset based on the estimate of remaining useful life.

12. The system of claim 11, wherein the instructions to identify one or more patterns of a degradation part of the signal and the normal part of the signal further include performing a multi-resolution differencing scheme.

13. The system of claim 12, the instructions further configured to generate one or more versions of the signal based on the multi-resolution differencing scheme.

14. The system of claim 13, the instructions further configured to determine a higher order difference of each one or more versions of the signal.

15. The system of claim 14, the artificial neural network further configured to identify the one or more patterns based on the higher order differences of each one or more versions of the signal.

* * * * *